(12) United States Patent
Hawkins et al.

(10) Patent No.: US 6,516,202 B1
(45) Date of Patent: Feb. 4, 2003

(54) MOBILE COMPUTER SYSTEM DESIGNED FOR WIRELESS COMMUNICATION EXPANSION

(75) Inventors: Jeffrey C. Hawkins, Redwood City, CA (US); Jerome C. Tu, San Jose, CA (US); Robert Y. Haitani, San Jose, CA (US); Christie L. Cadwell, Los Altos, CA (US); Karl A. Townsend, Los Altos, CA (US)

(73) Assignee: Handspring, Inc., Mountain View, CA (US)

( * ) Notice: Subject to any disclaimer, the term of this patent is extended or adjusted under 35 U.S.C. 154(b) by 0 days.

(21) Appl. No.: 09/374,095

(22) Filed: Aug. 12, 1999

(51) Int. Cl.[7] ................................................. H04B 1/38
(52) U.S. Cl. .................... 455/556; 455/573; 379/93.09; 379/93.05
(58) Field of Search ................................ 455/556, 557, 455/550, 573, 575, 90, 566, 413; 379/93.05, 93.09, 93.17, 93.19, 100.02

(56) References Cited

U.S. PATENT DOCUMENTS

| | | | |
|---|---|---|---|
| 5,584,054 A | | 12/1996 | Tyneski et al. |
| 5,797,089 A | * | 8/1998 | Nguyen ................... 455/556 X |
| 5,809,115 A | * | 9/1998 | Inkinen ................... 379/93.05 |
| 5,974,334 A | * | 10/1999 | Jones, Jr. ................ 455/556 X |
| 6,006,109 A | * | 12/1999 | Shin ........................ 455/556 X |
| 6,029,072 A | * | 2/2000 | Barber .................... 455/556 X |
| 6,035,214 A | * | 3/2000 | Henderson .................. 455/556 |
| 6,119,179 A | * | 9/2000 | Whitridge et al. ....... 455/556 X |
| 6,188,917 B1 | * | 2/2001 | Laureanti ................ 455/556 X |

FOREIGN PATENT DOCUMENTS

| | | |
|---|---|---|
| EP | 0 704 788 A2 | 4/1996 |
| FR | 2 760 933 A1 | 9/1998 |
| WO | WO99/08238 A1 | 2/1999 |

OTHER PUBLICATIONS

PCT International Search Report.
Nintendo of America (1996) Compact Video Game System.
PCMCIA Standards (1992) Personal Computer Memory Card International Association.

* cited by examiner

*Primary Examiner*—Tracy Legree
(74) *Attorney, Agent, or Firm*—Dag Johansen; Stattler, Johansen & Adeli LLP

(57) ABSTRACT

A method and apparatus for an organizer that may receive a cellular portion to form a cellular telephone is provided. An organizer comprises an organizer component, including a microphone. The organizer further includes an area for receiving an additional component. The area is designed to receive a cellular component, and a connection element is designed to mate the microphone in the organizer component with the cellular component, to use the organizer as a part of a cellular telephone.

29 Claims, 14 Drawing Sheets

Figure 5B

| Pin | Name | I/O/P[1] | Function | Pin | Name | I/O/P[1] | Function |
|---|---|---|---|---|---|---|---|
| 1 | GND | P | Ground | 35 | GND | P | Ground |
| 2 | D3 | I/O | Data bit 3 | 36 | CD1* | O | Tie to Ground |
| 3 | D4 | I/O | Data bit 4 | 37 | D11 | I/O | Data bit 11 |
| 4 | D5 | I/O | Data bit 5 | 38 | D12 | I/O | Data bit 12 |
| 5 | D6 | I/O | Data bit 6 | 39 | D13 | I/O | Data bit 13 |
| 6 | D7 | I/O | Data bit 7 | 40 | D14 | I/O | Data bit 14 |
| 7 | CS0* | I | Chip Select 0 | 41 | D15 | I/O | Data bit 15 |
| 8 | A10 | I | Address Bit 10 | 42 | CS1* | I | Chip Select 1 |
| 9 | OE* | I | Output Enable | 43 | N.C. | N.C. | No Connection |
| 10 | A11 | I | Address bit 11 | 44 | N.C. | N.C. | No Connection |
| 11 | A9 | I | Address bit 9 | 45 | N.C. | N.C. | No Connection |
| 12 | A8 | I | Address bit 8 | 46 | A17 | I | Address bit 17 |
| 13 | A13 | I | Address bit 13 | 47 | A18 | I | Address bit 18 |
| 14 | A14 | I | Address bit 14 | 48 | A19 | I | Address bit 19 |
| 15 | WE* | I | Write Enable | 49 | A20 | I | Address bit 20 |
| 16 | IRQ* | O | Interrupt Request | 50 | A21 | I | Address bit 21 |
| 17 | $V_{CC}$ | P | Card $V_{CC}$, 3.3V | 51 | $V_{CC}$ | P | Card $V_{CC}$, 3.3V |
| 18 | $V_{DOCK}$ | P | Dock Power | 52 | $V_{DOCK}$ | P | Dock Power |
| 19 | A16 | I | Address bit 16 | 53 | A22 | I | Address bit 22 |
| 20 | A15 | I | Address bit 15 | 54 | A23 | I | Address bit 23 |
| 21 | A12 | I | Address bit 12 | 55 | N.C. | N.C. | No Connection |
| 22 | A7 | I | Address bit 7 | 56 | N.C. | N.C. | No Connection |
| 23 | A6 | I | Address bit 6 | 57 | N.C. | N.C. | No Connection |
| 24 | A5 | I | Address bit 5 | 58 | RESET* | I | Reset |
| 25 | A4 | I | Address bit 4 | 59 | N.C. | N.C. | No Connection |
| 26 | A3 | I | Address bit 3 | 60 | MIC+ | I | Microphone+ |
| 27 | A2 | I | Address bit 2 | 61 | MIC- | I | Microphone- |
| 28 | A1 | I | Address bit 1 | 62 | N.C. | N.C. | No Connection |
| 29 | A0 | I | Address bit 0 | 63 | LOWBAT* | I | Low Battery |
| 30 | D0 | I/O | Data bit 0 | 64 | D8 | I/O | Data bit 8 |
| 31 | D1 | I/O | Data bit 1 | 65 | D9 | I/O | Data bit 9 |
| 32 | D2 | I/O | Data bit 2 | 66 | D10 | I/O | Data bit 10 |
| 33 | N.C. | N.C. | No Connection | 67 | CD2* | O | Tie to Ground |
| 34 | GND | P | Ground | 68 | GND | P | Ground |

1. Denotes Input, Output, or Power with respect to the peripheral device.
* Denotes active-low signals.

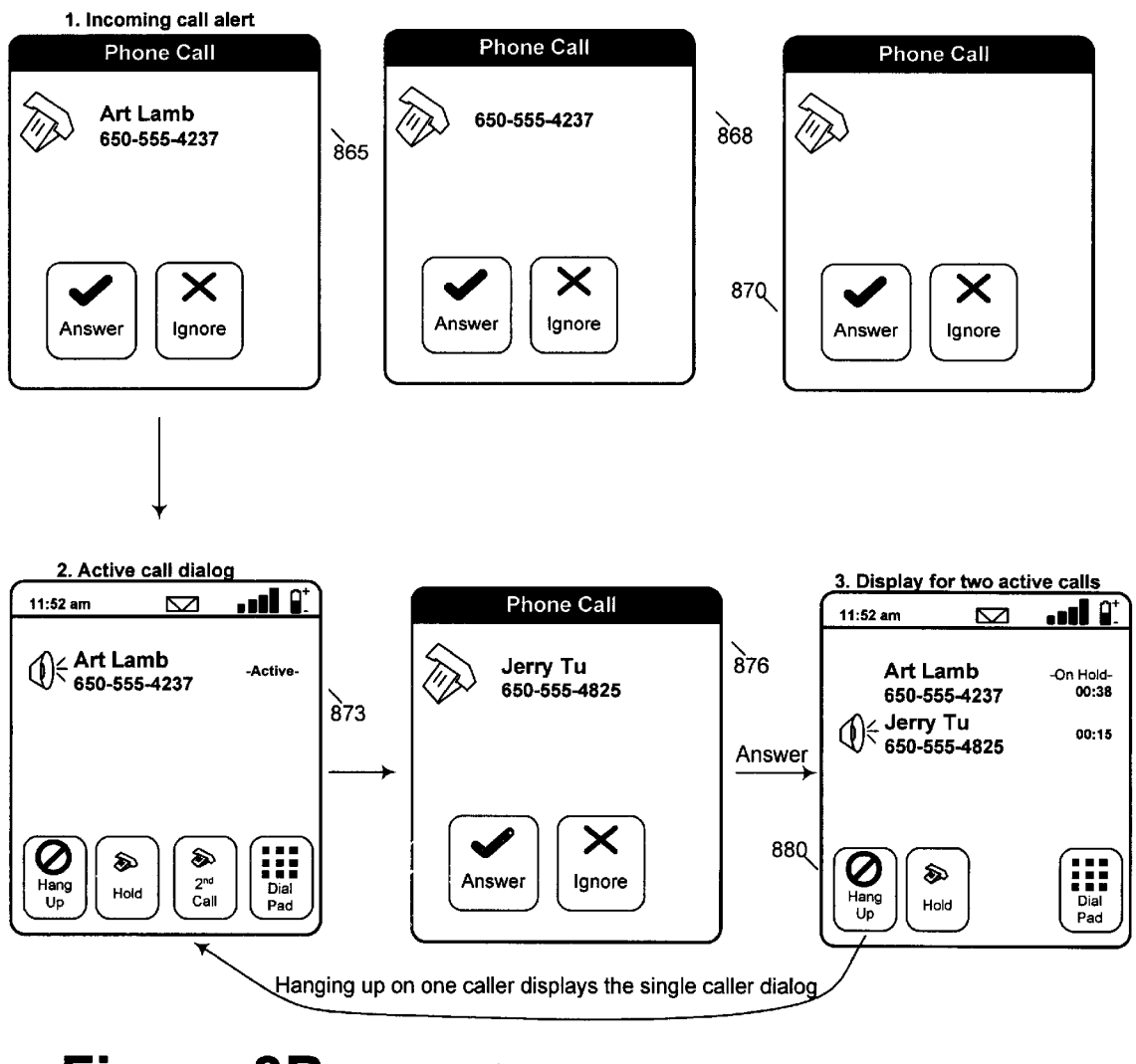
Figure 8B
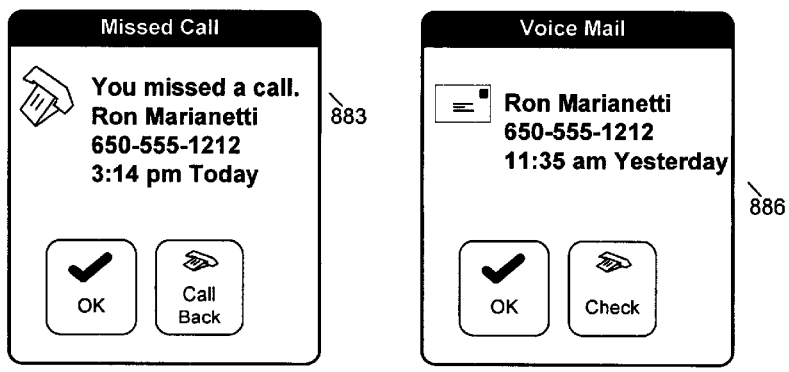

MOBILE COMPUTER SYSTEM DESIGNED FOR WIRELESS COMMUNICATION EXPANSION

FIELD OF THE INVENTION

The present invention relates to mobile computer systems, and more specifically, to a handheld computer system.

BACKGROUND

A cellular telephone is becoming an essential tool for more and more people. It is useful for being available while one is traveling, or out of the office. Most people also have organizers. These organizers range from paper-based systems such as the Day Runner to electronic handheld computers, such as the PalmPilot. The organizer is useful to keep a daily schedule, as well as for an address book. For many, if they wish to call someone on the cellular telephone, the user must look up the telephone number in the user's organizer, and then dial the number on the physically separate cellular telephone. This is inconvenient.

One prior art solution to this problem is the Qualcomm pdQ Smartphone, illustrated in FIG. 1. The Smartphone has a display indicator showing telephone mode status. The Smartphone also has a closed keypad with push-buttons for dialing telephone numbers. The Smartphone further includes status lights, a speaker, and a microphone.

FIG. 2 is an illustration of the prior art phone, open, showing the organizer screen. When the keypad is opened, an organizer is shown. The organizer includes a screen, a writing area, and soft buttons.

The Smartphone combines some of the functionality of an organizer and a telephone. However, having a Smartphone means that any time someone wishes to have an organizer with them, they must also carry the telephone. Furthermore, there is a separate dialing keypad for the telephone and a separate input area for the organizer, such that manufacturing the Smartphone is expensive. Therefore, an improved method and apparatus for combining the functionality of an organizer and a cellular telephone would be advantageous.

SUMMARY OF THE INVENTION

An organizer designed for a cellular telephone expansion is described. An organizer comprises an organizer component, including a microphone. The organizer further includes an area for receiving an additional component. The area is designed to receive a cellular component, and a connection element is designed to mate the microphone in the organizer component with the cellular component, to use the organizer as a part of a cellular telephone.

DESCRIPTION OF THE DRAWINGS

The present invention is illustrated by way of example, and not by way of limitation, in the figures of the accompanying drawings and in which like reference numerals refer to similar elements and in which:

FIG. 5B is a diagram of the interconnections formed between the telephone element and the organizer element.

FIG. 8B shows screen shots as the system is navigated through an incoming call alert.

DETAILED DESCRIPTION

An organizer designed to receive a cellular component, and thereby form a unitary cellular telephone is described. The organizer is an independent handheld computer which functions without the cellular component. However, when the cellular component is inserted into the organizer, a single telephone is formed. This is advantageous because it simplifies development of both the organizer component and the cellular component, because it permits a single organizer to be coupled to a plurality of telephones for different frequencies/standards so that the cellular telephone may be used in different parts of the world, and because the user need not carry a full cellular telephone around, if he or she wishes to have an organizer available.

The present specification discusses an organizer component and a cellular component. The organizer component may be any handheld computer, or small size electronic device. The organizer component generally includes a processor, a screen, and a way of interacting with a user. For one embodiment, the organizer component uses the Palm Operating System from 3Com Corporation.

The specification further discusses a cellular component. The cellular component includes any wireless communication device. For one embodiment, the cellular component may be a mobile telephone, such as a TDMA, CDMA, GSM, PCS, DCS, digital or other telephone. The cellular component may be enabled to make voice connections and/or digital data connections.

Figure 1:
FIG. 1 is an illustration of a prior art phone.
Figure 2:
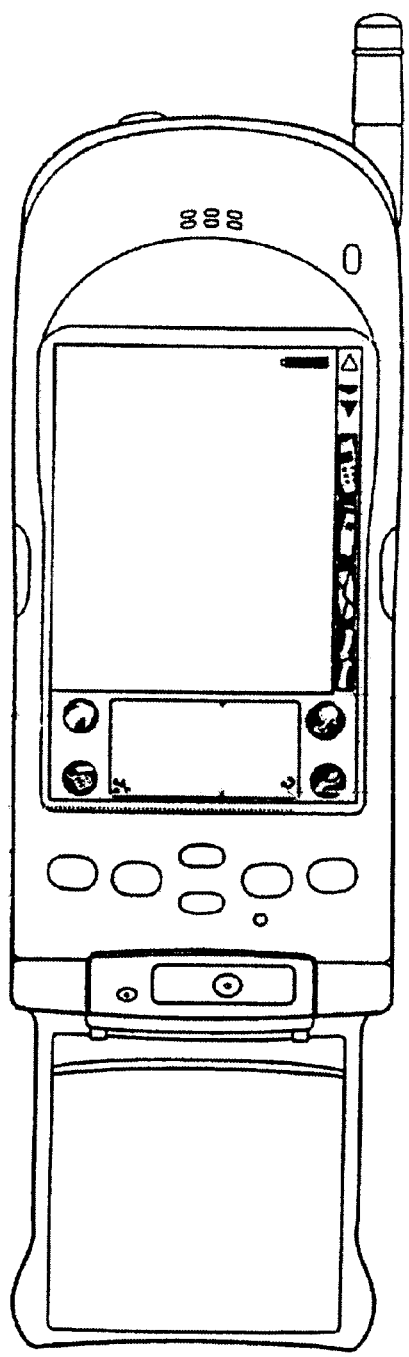
FIG. 2 is an illustration of the prior art phone, open.
Figure 3A:
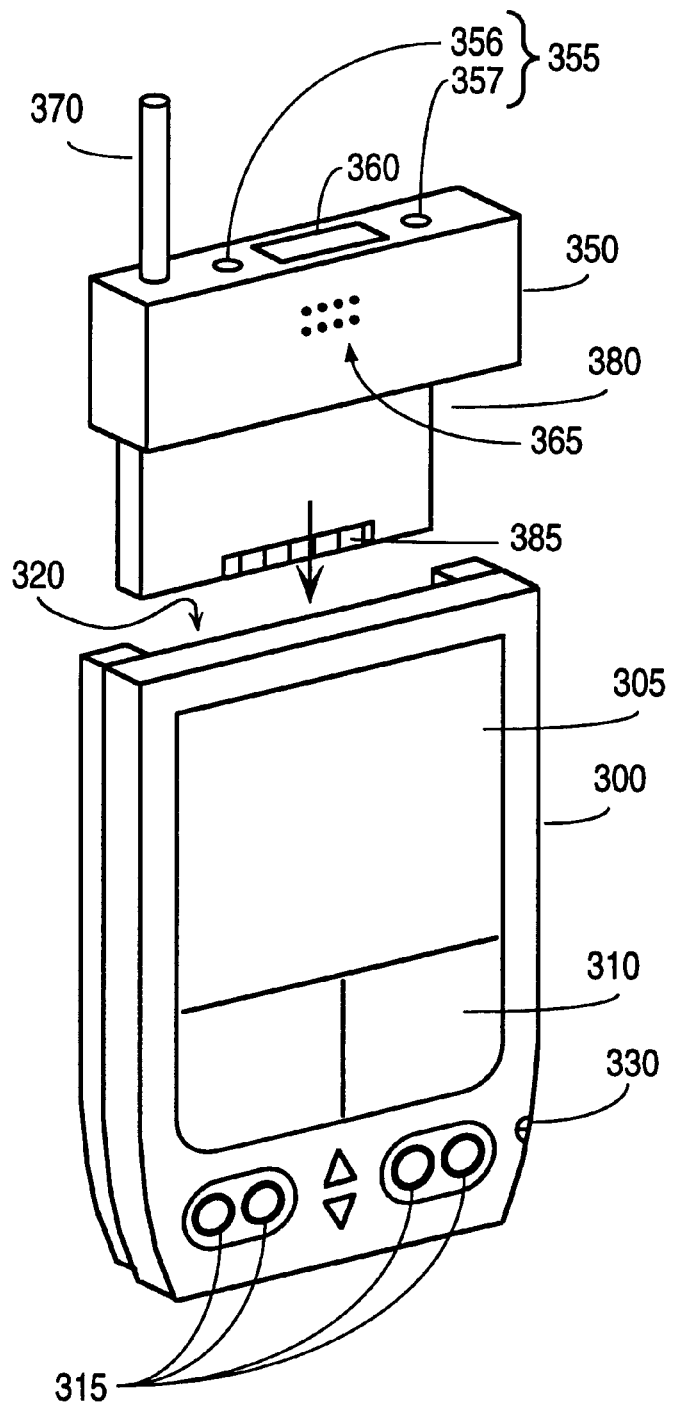
FIG. 3A is an exploded view of one embodiment of the telephone according to the present invention.

FIG. 3A is an exploded view of one embodiment of the telephone according to the present invention. The telephone includes two components, the organizer component 300 and the cellular component 350. The organizer component 300 includes a screen 305. The screen 305 may display text, images, or software generated keys, which are drawn on the screen. The screen 305 may display other types of information as well.

The organizer 300 further includes a writing area 310, on which a user may enter information. For one embodiment, the user may also enter information by writing directly on screen 305.

The organizer 300 further includes keys 315 for controlling the display of the organizer 300. For one embodiment, the keys 315 may be set to bring up various applications. For one embodiment, the keys 315 may be user programmable.

The organizer 300 includes a serial connection to couple the organizer to a computer system. For one embodiment, the serial connection may be used to synchronize the organizer with the computer system. For one embodiment, the serial connection is a Universal Serial Bus (USB) connection. For another embodiment, the serial connection is an RS-232 connection. Alternative types of connections may be used.

Figure 3B:
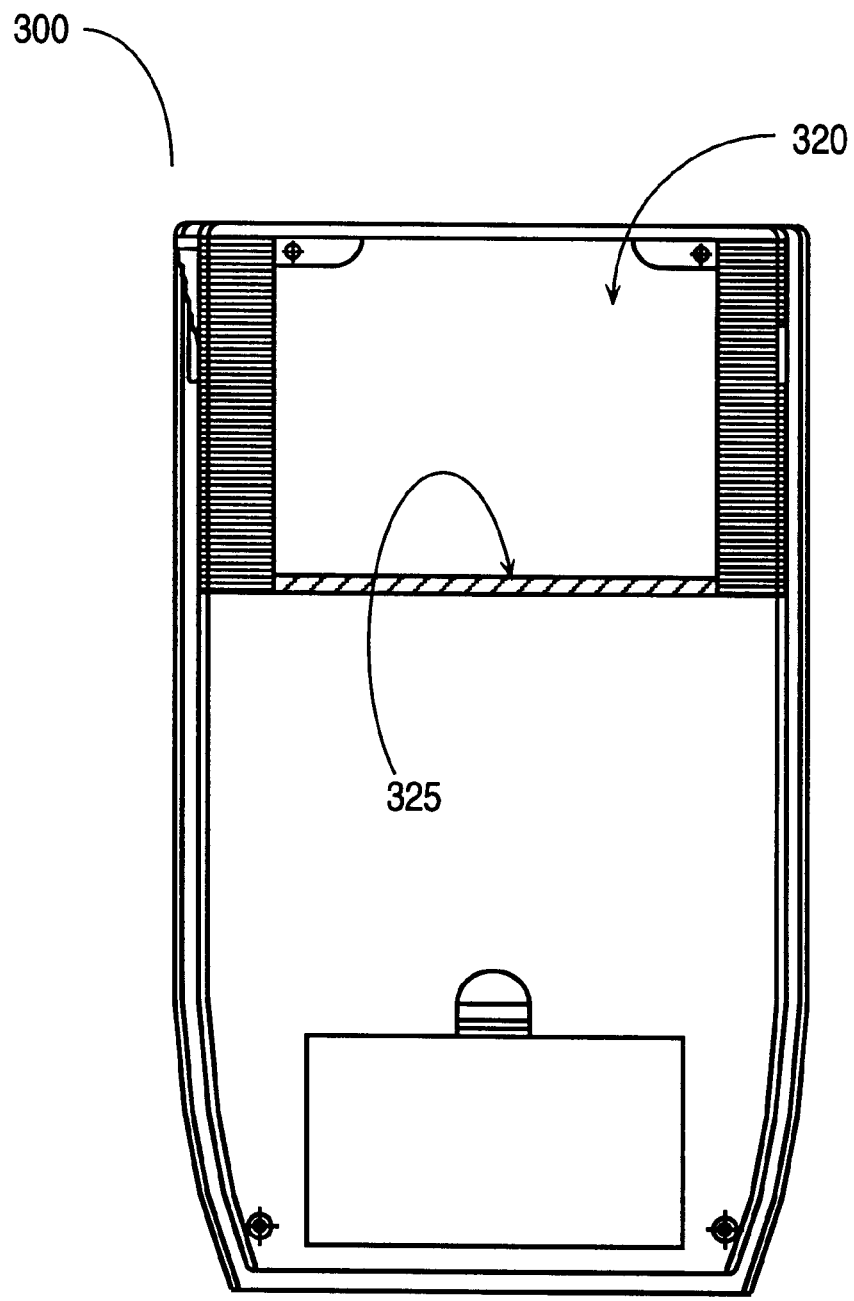
FIG. 3B is a back view of the organizer.

The organizer 300 further includes a void 320 in the back area of the organizer 300. The void 320 is designed to receive an extra element. For one embodiment, the extra element may be a simple place holder. For another embodiment, the extra element may be something else. The void 320 includes a connection portion 325. The connection portion 325 leads signals and other connections from the organizer component to the void 320. FIG. 3B shows a back view of the organizer, showing the connection portion 325 at the bottom of the void 320.

For one embodiment, at least some of the connections may be connected from the processor on the organizer component. For one embodiment, at least one connection may be directly coupled from the serial connection of the organizer component, used for synchronizing the organizer with a computer system. For one embodiment, the connection portion 325 is designed to mate with the extra element placed in the void 320.

For one embodiment, the organizer 300 further includes a microphone 330. The input of the microphone 330, for one embodiment, is coupled directly to the connection portion 325, such that any sound picked up by the microphone is transmitted to the extra element that is connected to the connection element 325 of the organizer 300.

For one embodiment, a cellular element 350 is the extra element that may be coupled into the void 320. The cellular element 350 includes a control button 355, for one embodiment, a power. button. For one embodiment, the control button 355 may have multiple functionalities, or there may be multiple control buttons 355.

For one embodiment, the cellular element includes a voice connection button 356 and a data connection button 357. The voice connection button 356 is used to initiate a voice connection, to receive or place a voice telephone call. For one embodiment, when the user pushes the voice connection button 356 a dialing screen is displayed, permitting the user to select a telephone number for a voice connection. The data connection button 357 is used to initiate a data connection, for access to the World Wide Web, e-mail, fax, or other data transfer. When the user pushes the data connection button, a data screen is displayed, permitting the user to connect to e-mail, the Web, a fax interface, or other data interface.

The cellular element 350 further may include a status indicator 360. The status indicator 360 may be a light, a display panel, or other indicator of status. For one embodiment, the status indicator 360 may include multiple lights or other indicators. For one embodiment, if the status indicator 360 is a single light that can display multiple colors such that different colors indicate different statuses.

The cellular element 350 may further include an antenna 370 and a speaker 365. The cellular element 350 includes a connector 385. A lower portion 380 of the cellular element 350 is sized such that it fits into the void 320 of the organizer 300. When the lower portion 380 is inserted into the void 320, the connector 385 is coupled to the connection portion 325, thereby completing a circuit. Signals are thus routed between the cellular element 350 and the organizer 300.

The cellular element 350, for one embodiment, does not include a microphone. Rather, when the cellular element 350 is mated to the organizer 300, the microphone 330 in the organizer 300 is used by the cellular element 350.

Figure 4:
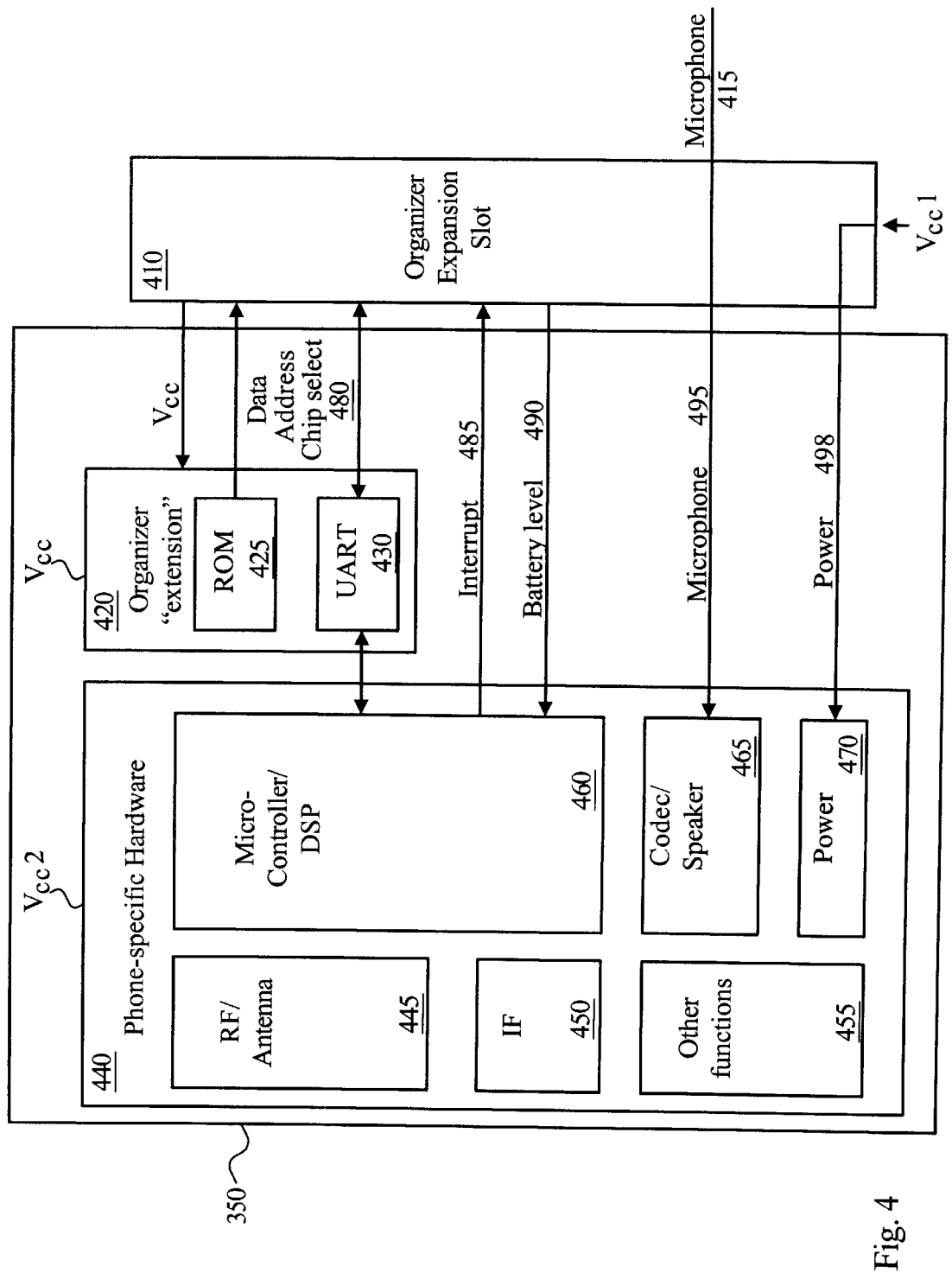
FIG. 4 is a block diagram of the hardware elements of the system.

FIG. 4 is a block diagram of the hardware elements of the system. The expansion slot 410 is the connection portion 325 of the organizer 300 (not shown.) The expansion slot 410 is coupled to the organizer extension 420.

The organizer extension 420 is hardware which is part of the cellular element, but is under the control of the organizer, and behaves as an extension of the organizer. The organizer extension 420 includes read only memory (ROM) 425, and a bidirectional communication medium. For one embodiment, the bi-directional communication medium is a Universal Asynchronous Receiver Transmitter (UART) 430. For another embodiment, the bidirectional communication medium may be a FIFO, Dual-port, RAM, registers, or other such devices.

The ROM 425 includes the code to install a portion of the software on the organizer to allow the organizer to interface with the cellular element, and to uninstall the installed software. For one embodiment, the ROM 425 further includes software which is executed in-place by the organizer.

The phone specific hardware 440 is the hardware in the cellular element that is used to control specific telephone functionalities. The phone specific hardware 440 may include: a radio frequency (RF)/antenna 445, an IF logic 450, a power connection 470, a coder/decoder/speaker unit 465, a microcontroller 460, and other functions 455.

For one embodiment, the microcontroller 460 includes a digital signal processor (DSP). The microcontroller 460 interfaces with the organizer, via the organizer extension slot 410 and the UART 430. The microcontroller 460 also controls the functions of the other elements of the cellular element. The microcontroller 460 sends an interrupt signal 485 to the organizer when a telephone call is received. For one embodiment, the "telephone call" can include voice, data, or fax connections.

For one embodiment, the microcontroller 460 also monitors the battery level signal 490. If the battery level signal 490 indicates that the organizer does not have a battery in or if the battery level is below a threshold, the microcontroller 460 does not send the interrupt signal 485. Generally, when a call is received, the organizer is asked to respond. Using the battery level signal 490, the organizer is not asked to respond when the battery level is below the threshold. This prevents the stand-by power from being exhausted, possibly leading to memory loss.

The codec/speaker 465 receives a microphone signal 495 from the organizer expansion slot 410. For one embodiment, the microphone signal 495 is connected directly through the organizer from a microphone 415 in the organizer. The organizer itself does not touch the microphone signal 495, but merely passes it to the codec/speaker 465. The speaker itself is in the cellular element. In this way, the microphone 415 in the organizer is integrated into the codec/speaker 465 in the cellular element.

The power 470 is a battery or other storage device to maintain power to the microcontroller 460 and the other elements of the cellular element. The power 470, for one embodiment, receives a power connection 498 from the organizer. The power connection 498 may provide auxiliary power, operational power, or charging power to the cellular element. For one embodiment, the power connection 498 is connected through the organizer expansion slot 410, to an organizer cradle slot. One of the interconnections between the organizer and the cradle is a power connection. This power connection is routed through the organizer, without being used within the organizer, to couple the power signal 498 to the power element 470, when the cellular element is coupled to the organizer. The power connection is used to charge the battery in the cellular element. For one embodiment, the power element 470 may further include a backup power source, such as a battery or capacitor, to maintain memory or otherwise maintain necessary data within the phone-specific hardware 440, if the cellular element has not been charged in some period.

Figure 5A:
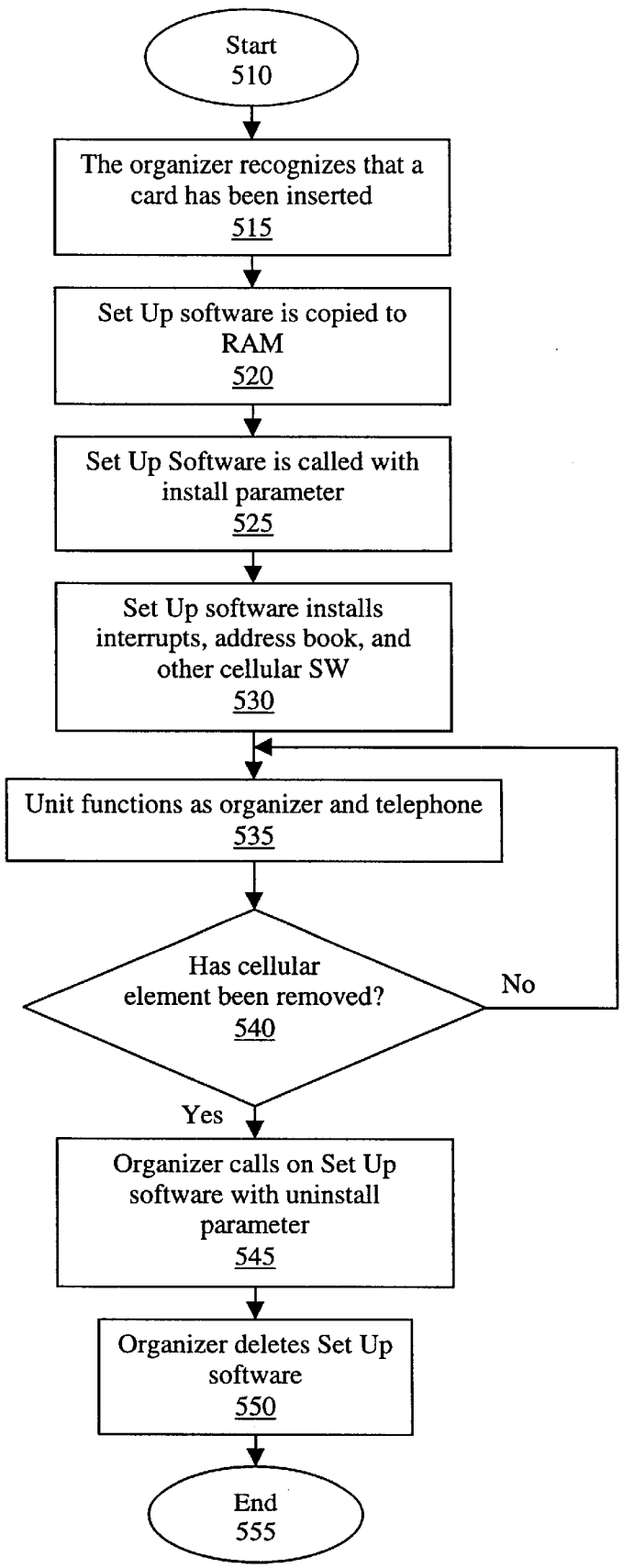
FIG. 5A is a flowchart of the process of integrating the cellular component and the organizer component.

FIG. 5A is a flowchart illustrating one embodiment of the process of integrating the cellular component and the organizer component to form a single unit. The process starts at block 510, when the user couples the cellular component into the slot of the organizer component.

At block 515, the organizer recognizes that a card has been inserted into the expansion slot. For one embodiment, a hard interrupt is sent to the organizer when a card mates with the card connection of the organizer.

At block 520, the Set Up application software is copied to RAM from the cellular component's ROM.

At block 525, the organizer calls the Set Up software with an install parameter. The cellular component queries the organizer which language is being run by the organizer. For one embodiment, the organizer may have multiple language support. Based on the language supported by the organizer, the appropriate language software is selected to be uploaded and moved into RAM.

At block 530, the Set Up software uploads any software needed to interface the cellular component and the organizer. For one embodiment, this may include operating software, interrupts, an updated address book, and other software. For one embodiment, portions of the software executed by the organizer are executed in-place directly from the cellular component's memory.

At block 535, the newly formed cellular telephone unit, consisting of the organizer and the cellular element, can be used. In this period, the user can place telephone calls, receive calls, use a dialing screen, or access data wirelessly from the cellular telephone unit. For one embodiment, the overall function of the organizer is not impacted by the presence of the cellular element. However, if a telephone call is received, the cellular element interrupts or wakes up the organizer, and otherwise interacts with the organizer to permit a user to take the telephone call.

At block 540, the system determines whether the cellular element has been removed from the slot. For one embodiment, this is an interrupt driven system, and the organizer does not test this function. Rather, the organizer recognizes the removal of the cellular element.

At block 545, the organizer calls on the Set Up application with a remove parameter, to remove all software, hooks, and anything else uploaded to operate the cellular element.

At block 550, after the Set Up application has finished the removal process, the organizer deletes the Set Up application. The organizer is now returned to the same state it was operating in prior to the insertion of the cellular element. The process ends at block 555.

FIG. 5B is a diagram of one embodiment of the connector pin list for the expansion slot. The pins include a low battery pin indicator, pin 63. As described above, the low battery indicator signal on pin 63 indicates when there is no battery in the organizer or when the battery is below a threshold level. For one embodiment, this results in the cellular element not "waking up" the organizer when a telephone call is received.

The pins include microphone pins, pins 60 and 61. Microphone pins transmit the microphone signal from the organizer to the codec of the cellular element. By transmitting the microphone signal as a differential pair, the effects of noise are reduced.

The pins further include VDOCK, pins 18 and/or 52, or docking voltage. This signal transmits the power connection from the cradle to the cellular component, as described above.

For one embodiment, the physical header is similar to the pins of PCMCIA standard. This is advantageous because it permits a cellular component to use an off-the-shelf connector. For one embodiment, the key of the socket is different from PCMCIA standard, such that a PCMCIA card can not be accidentally inserted into the organizer.

Of course, it is to be understood that this is merely an exemplary pin out, and the pin order as well as content could be changed without changing the present invention.

Figure 6:
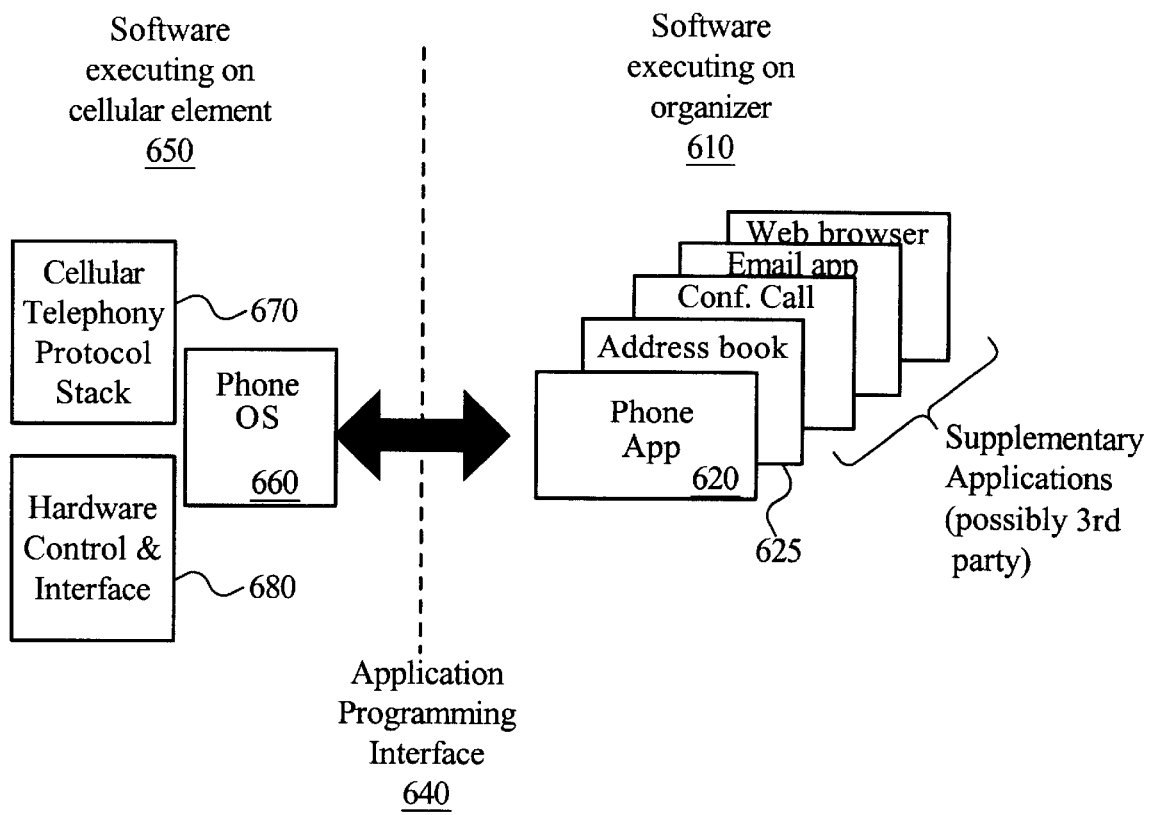
FIG. 6 is a block diagram of the software elements of the system.

FIG. 6 is a block diagram of the software elements of the cellular element's system. The software includes software that executes on the organizer 610 and software that executes on the cellular element 650. For one embodiment, the software that executes on the organizer 610 may be executed in place from the cellular component's memory. For another embodiment, the software that executes on the organizer 610 may be uploaded to the organizer memory, and executed from there.

The software that executes on the organizer 610 includes a phone application 620. The phone app 620 controls the user interface, database, and system level operations of the cellular element. The software that executes on the organizer may further include an address book 625. For one embodiment, the organizer includes an address book that is changed in format when the cellular element is coupled to the organizer. For example, for one embodiment, the address book displays a single-key dialing ability when the cellular element is coupled to the organizer.

Other applications 630, such as conference calling, e-mail, web browser, etc. may be part of the software that runs on the organizer 610. Any application that is altered by the connection of the cellular element to the organizer would be included in this list.

The software that executes on the cellular element 650 interfaces with the software that executes on the organizer 610 using an application programming interface (API) 640. For one embodiment, the API 640 runs over serial communications, over the bi-directional communications medium.

For one embodiment, the software that executes on the cellular element 650 runs on the microcontroller in the cellular element. For one embodiment, the software that executes on the cellular component 650 includes the phone OS 660, cellular telephony protocol stack 670, and hardware control and interface 680. The cellular telephony functions include the cellular protocol stack, frequency/code selection, control of data services, etc. For one embodiment, functions directly related to making a connection to the network are handled in the software that executes on the cellular component 650. Functions for database management, storing and retrieving information about the connection, etc. are executed on the organizer.

Figure 7:
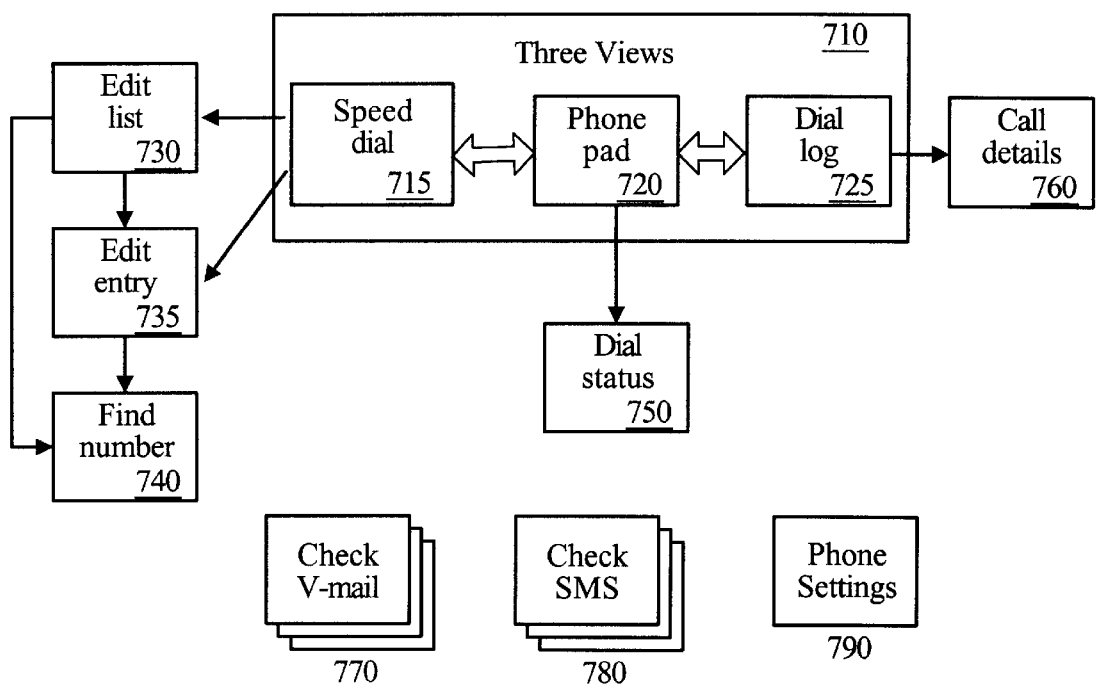
FIG. 7 is a diagram showing the screen options of the system.

FIG. 7 is a diagram showing one embodiment of the screen options of the system. The base views 710 include three screens, the speed dial screen 715, phone pad 720, and dial log 725. The speed dial screen 715 permits access to an edit screen 730, on which the user can edit the list of speed-dialed numbers, an edit entry screen 735 which permits editing of an existing entry, and a find number screen 740 which permits a search of existing telephone numbers, in the address book and elsewhere, to add to an entry. The phone pad 720 includes software generated numbers to dial. The dial status screen shows the status of current calls. The dial log screen 725 includes a log of past dialed and/or received telephone calls. The dial log screen 725 permits access to the call details screen 760. The dial status screen 750 displays information about an ongoing call or calls. For one embodiment, the dial status screen 750 is automatically displayed on the viewer screen whenever a voice call(s) is established.

Figure 8A:
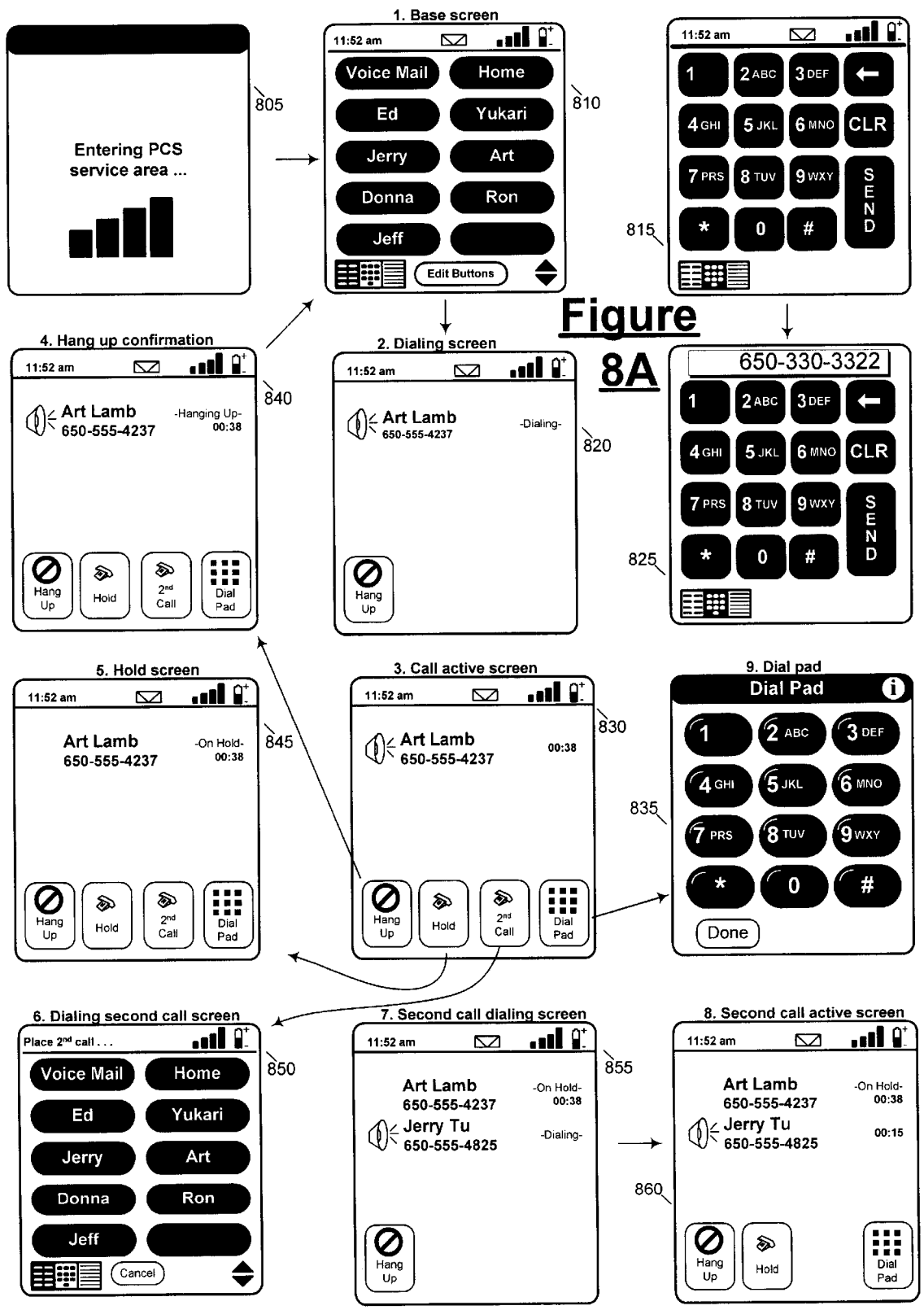
FIG. 8A shows screen shots as for a dialing process.

FIG. 8A shows one embodiment of screen shots for a dialing process. The opening screen 805 indicates that a connection has been established with a cellular service. For one embodiment, this screen appears when the cellular element is first coupled to the organizer and/or when the cellular element is initially turned on.

The base screen is the speed dialing screen 810. Programmed speed dialing screen 810 includes identifiers for each of the individuals programmed into the speed dialer. The identifiers are designated by the user, and may be nicknames, or other identifiers. For one embodiment, the top left hand slot is a voicemail slot.

On the bottom left of the speed dialing screen 810 are indicated the other base screens, the dial pad screen 815, and the call history screen (not shown). An option to edit the speed dial listings is also provided.

At the top of the speed dialing screen 810, and every other base screen for one embodiment, are indicators. There is a time indicator, a message indicator, a signal strength indicator, and a battery strength indicator. For one embodiment, there are two message indicators, indicating either a voicemail message or a text/e-mail message. For one embodiment, the message indicator may further include service provider information as well.

From the speed dialing screen 810, if a user presses a speed dial button, the screen changes to the dialing screen 820. The dialing screen 820 indicates the status of the call, as well as the identity of the person called. For one embodiment, there is a hang-up option. When the call is connected, the call active screen 830 is displayed, showing the connection time, and providing the options of hanging up, placing the call on hold, placing a second call, or engaging the key pad (to dial additional numbers, such as for a credit card call, voicemail call, dialing an extension, etc.)

If the user selects "second call", the speed dialing screen 850 appears, although the user may optionally switch to another screen. The first call is automatically placed on hold. The second call is then dialed. The-two-call dial status screen 855 indicates the status of both calls. For one embodiment, only one call can be active at any time. For another embodiment, multiple calls may be simultaneously active, and in such a case, the calls may be conferenced together.

An alternative base screen is the dialing pad 815. The dialing pad 815 displays the software generated dialing keys. When the user starts dialing, the dialing screen 825 is displayed, and the numbers dialed replace the status indicators at the top of the screen.

Of course, these screens are sample screens only. Altering the location or display format of any of this data is optional, and would not change the present invention.

FIG. 8B shows screen shots as the system is navigated through an incoming call alert. The incoming call alert displays a call alert screen 865. For one embodiment, if there is a caller identification enabled, the system determines the telephone number of the caller. If that telephone number appears in the call list, or on any other system that indicates the identity of the caller, the incoming screen 865 is displayed, showing the telephone number and identity of the caller. If the identity of the caller is unknown, the telephone number is displayed as shown on screen 868. And if the caller identification is not enabled, no identifier is displayed, as shown on screen 870.

The user may chose to answer the call, by pushing the answer button, or ignore the call. For one embodiment, the answer button may be a software generated button. For one embodiment, the user may also accept or ignore the call by pushing a built-in button on the cellular element. If the user ignores the call, and voicemail is enabled on the system, the call is automatically transferred to voicemail. For one embodiment, if the user ignores the call, the call may be transferred to a user designated destination. A missed call screen 883 is displayed, showing the identity, telephone number, time and date of call. The user may acknowledge the missed call, or may automatically return the call, if caller identification is enabled. For one embodiment, if the caller left a message on voicemail, a third option is displayed, permitting the user to listen to the voicemail left by the caller, shown on voicemail screen 886.

If the user answers the call, the active call screen 873 is shown. From here, the user can place the caller on hold, hang up, dial a second call, or receive a second call. When a second call is received, the first call is placed on hold, for one embodiment. In this way, the maximum amount of information is displayed to the user, regarding the status of various calls and systems.

Figure 8C:
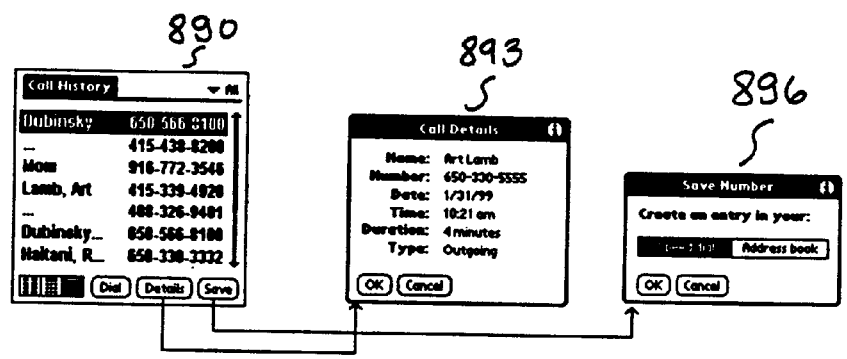
FIG. 8C shows one embodiment of screen shots for a call history.

FIG. 8C shows one embodiment of screen shots for a call history. For one embodiment, the call history screen 890 shows available information about calls made and calls received. For one embodiment, only the name and telephone number are displayed. For one embodiment, the list is ordered by time/date of the call. For another embodiment, the list may be ordered by name. For one embodiment, the user may select details. The details screen 893 shows further available information about the call. The details screen 893 shows one or more of the following: name, number, date, time, duration of call, and type of call. For one embodiment, the user may edit the information displayed in the detail, specifically by adding/changing the name information. This would enable a user to have a more complete call history information.

The user can further save information from the call history. If the user selects the "save" button, a save screen 896 is displayed. This save screen 896 permits the user to automatically add data from the history entry to his or her speed dial list and/or address book. For one embodiment, if other programs are supported, the user may further add the data into other programs, such as a contact tracker, etc. For one embodiment, the call history may interface with a contact tracking application, and automatically update information in the contact tracking application, as calls are made and received.

Figure 9A:
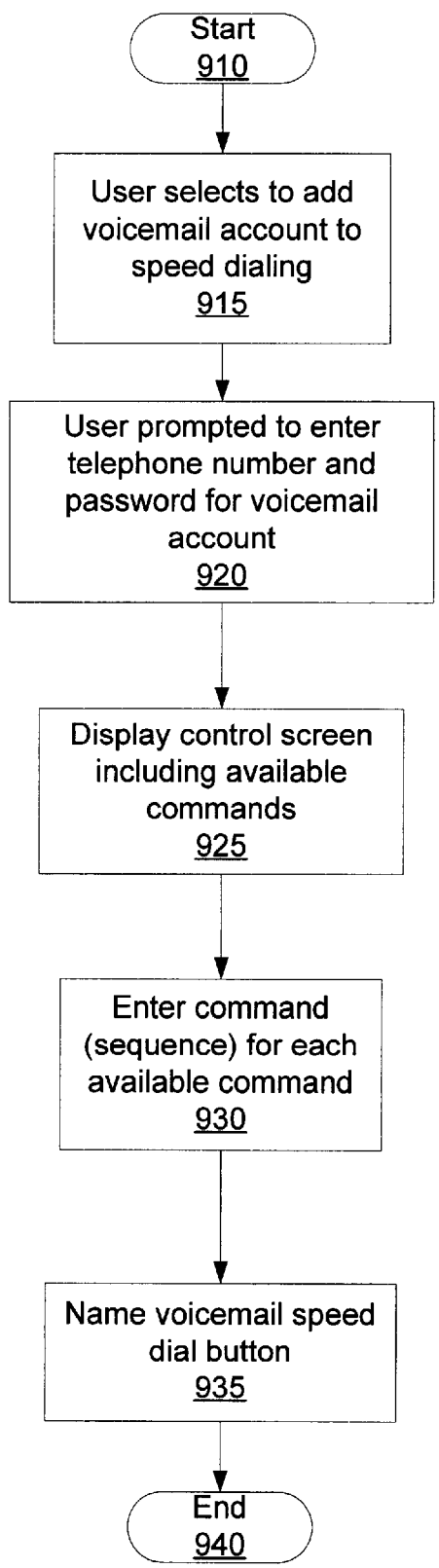
FIG. 9A is a flowchart showing one embodiment of the programming of voicemail access.

FIG. 9A is a flowchart showing one embodiment of adding a voice mailbox to the speed dial of the system for voicemail access. The process starts at block 910.

At block 915, the user selects to add a new voicemail account to the speed dialing list. Voicemail programmed speed dial buttons are treated differently from other speed dial buttons.

At block 920, the user is prompted to enter the telephone number and/or password for the voicemail account. For one embodiment, the user is permitted to use "pause" characters or "wait for tone" characters, to dial the full voicemail access code. For another embodiment, when the user first pushes the voicemail button, the telephone number is dialed, and when the user pushes the voicemail button for a second time, the password is dialed. Both of these numbers are entered at this stage.

At block 925, control screen is displayed. The control screen includes each of the commands that are generally available in a voicemail system, such as previous message, next message, back, skip message, delete message, forward message, back to the beginning, reply to message, etc. For one embodiment, a subset of these commands may be made available. For another embodiment, the user may alter this listing, and may create new commands.

At block 930, the user is prompted to enter a command or command sequence for each of the commands that are available in the voicemail system. For example, in a voicemail system, pressing the "3" key may mean "delete message." The user can enter the number "3" underneath the command key, to program the command. In other systems, the pressing the "7" key twice may be the code to "delete message." The user can enter whatever key combination works for the specific voicemail system.

At block 935, after the user finishes programming the voicemail system, the user is prompted to name the speed dial button. For one embodiment, the default name is "voicemail." However, users may have multiple voicemail accounts, and may wish to have more descriptive names. At block 940, the process ends. The programming of the voicemail access is now complete, and the user can access the voicemail system by pressing the speed dial button.

Figure 9B:
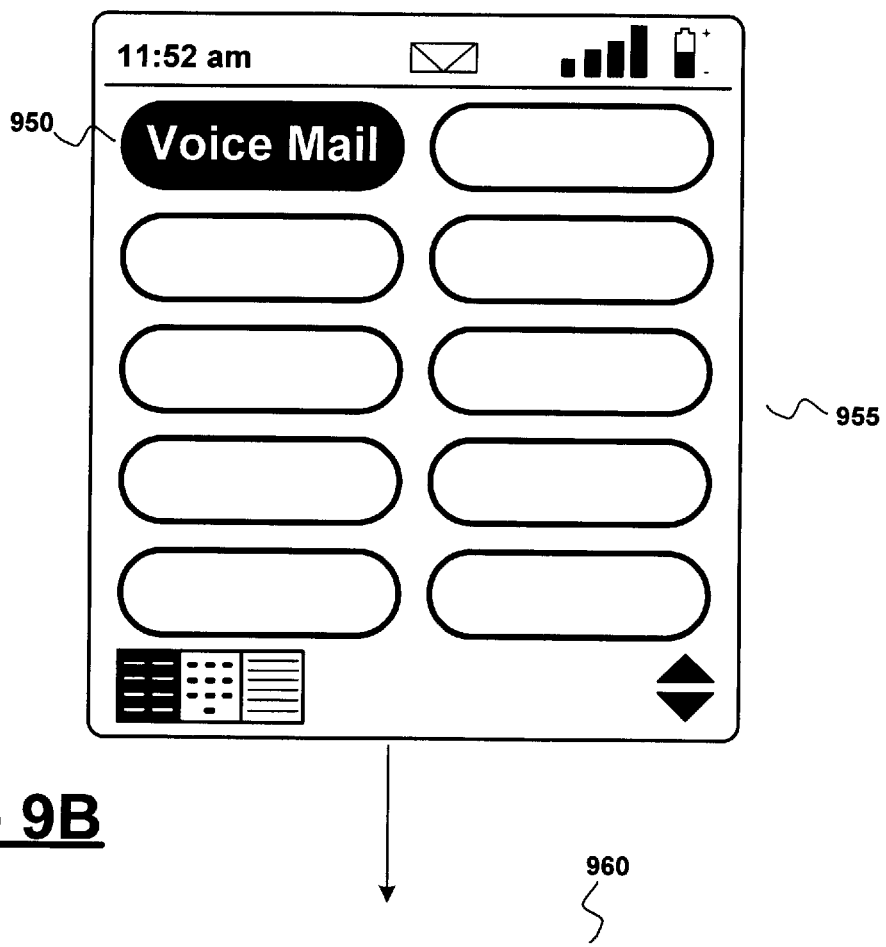
FIG. 9B shows one embodiment of screen shots for voicemail control.
Figure 9B:
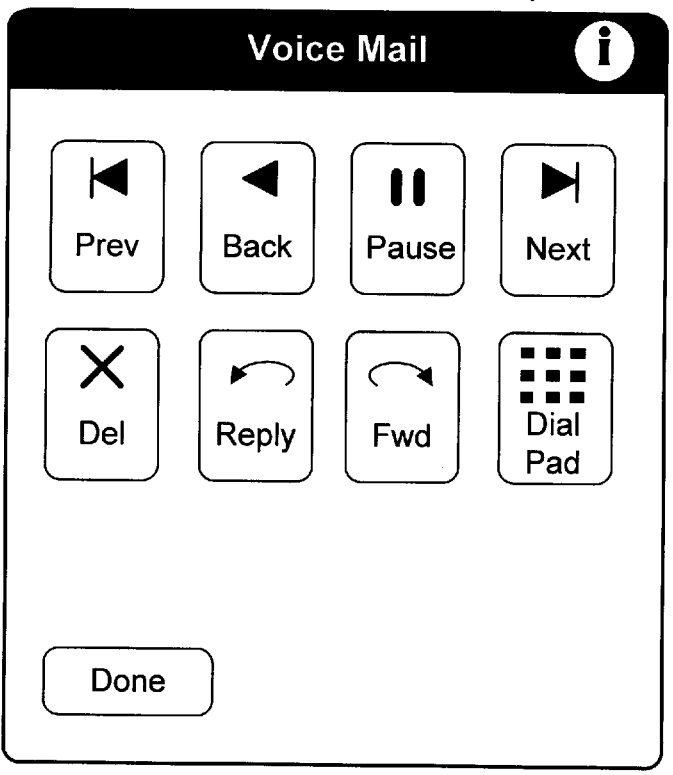

FIG. 9B shows one embodiment of screen shots for voicemail control. The voicemail button 950 is shown on speed dialing screen 955. When the user selects the voicemail button 950, the voicemail number programmed in by the user is dialed. For one embodiment, the dialing screen is shown (see screen 820). When the call connects the voicemail control screen 960 is displayed. The voicemail control screen 960 includes the controls available for the voicemail system. Control screen 960 is an exemplary screen, showing the controls: prev(ious message), back (to the beginning of the message), pause, next (message), del(ete message), reply (to message), forward (message), and dial pad, for entering additional commands. Other layouts or sets of commands may be used. However, using this type of voicemail control screen 960 for all voicemail applications simplifies access to multiple voicemail accounts.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A telephone system comprising:
    a cellular component comprising circuitry for executing cellular protocol; and
    a handheld organizer component for executing organizer applications, the handheld organizer component designed to removably mate with the cellular component, the handheld organizer component comprising a microphone, an output of said microphone directly coupled to said cellular component when said cellular component is coupled to said handheld organizer component;
    wherein the cellular component and the organizer component together form a single telephone unit.

2. The telephone system as claimed in claim 1, wherein the microphone is located on a bottom of a front face of the handheld organizer component.

3. The telephone system as claimed in claim 1, wherein the handheld organizer component and the organizer applications are operable without the cellular component.

4. The telephone system as claimed in claim 1, wherein when the cellular component further comprises organizer extension software, the organizer extension software executed on the handheld organizer component when the handheld organizer component and the cellular component are coupled together.

5. The telephone system as claimed in claim 4, wherein the organizer extension software enables the handheld organizer component to interact with the cellular component.

6. The telephone system as claimed in claim 4, wherein the cellular component further erases the interface software from the handheld organizer component, when the cellular component is disconnected from the handheld organizer.

7. A telephone system comprising:
    a handheld organizer component including a microphone, said microphone directly connected to an expansion interface; and
    a cellular component comprising circuitry for executing cellular protocol, the cellular component designed to removably mate with said expansion interface of the handheld organizer component, the cellular component directly using the microphone in the handheld organizer component to form a single telephone unit.

8. A system comprising:
    a handheld organizer component including organizer applications and an electrical interface including a plurality of electrical connections, one of the electrical connections being a power signal through-put connection; and
    a cellular component, the cellular component designed to removably mate with the handheld organizer component and establish the plurality of electrical connections, the cellular component using the power signal through-put connection in the handheld organizer component to charge its battery;
    wherein the handheld organizer component is operable using said organizer applications without said cellular component and said handheld organizer component and the cellular component forming a single telephone when said cellular component is coupled to said handheld organizer component.

9. The system as claimed in claim 8, further comprising:
    a cradle for being coupled to a computer system;
    the handheld organizer component further comprising an interface for being coupled to the cradle, the cradle providing a connection to the computer system for the handheld organizer component.

10. The system as claimed in claim 9, the cradle further for providing a power connection.

11. The system as claimed in claim 10, wherein the handheld organizer component includes a power lead, for leading the power connection from the cradle interface to the power signal through-put coupled to said cellular component.

12. The system as claimed in claim 11, wherein the power lead comprises a wire.

13. The system as claimed in claim 9, wherein the cradle comprises a bus connection to the computer system and a power connection.

14. The system claim as claimed in claim 13, wherein the bus connection comprises a Universal Serial Bus (USB) connection.

15. The system as claimed in claim 8, wherein the handheld organizer component further includes a microphone, the microphone being directly connected into the cellular element when the handheld organizer component and the cellular elements are mated.

16. A system comprising:
an organizer including a processor and plurality of applications for running on the processor, the organizer being a stand-alone device;
a cellular component including a processor and a plurality of applications, the cellular component designed to be removably coupled to the organizer, such that when the cellular component is coupled to the organizer, some of the plurality of applications on the cellular component are executed on the processor of the organizer; and
a Read Only Memory (ROM) in said cellular component, said ROM including a Set Up application,
wherein the cellular component and the organizer together form a telephone.

17. The system of claim 16, wherein the Set Up application comprises software used to interface the cellular component and the organizer.

18. The system of claim 16, wherein the Set Up application is further for being called with an uninstall parameter, the Set Up application further for removing the software used to interface the cellular component and the organizer, when the cellular component is removed from the organizer.

19. The system of claim 16, further comprising:
software executed on the processor of the organizer, wherein said software is executed in-place.

20. An organizer comprising:
a handheld organizer component, including a microphone; and
an expansion interface for receiving a peripheral component, wherein the expansion interface is designed to receive a cellular component comprising circuitry for executing cellular protocol, and the expansion interface is designed to directly connect the microphone in the handheld organizer component with the cellular component such that the handheld organizer component coupled to the cellular component form a cellular telephone.

21. A wireless communication system comprising:
an handheld computing device including a screen;
a wireless communication device designed to be coupled to the handheld computing device to form the wireless communication system, the wireless communication device including:
a first application button for invoking voice control of the wireless communication device, the first application button invoking a voice interface dialog on the screen of the handheld computing device; and
a second application button for invoking data control of the wireless communication device, the second application button invoking a data interface dialog on the screen of the handheld computing device.

22. A modular cellular telephone, comprising an organizer and a cellular component, the organizer having a screen including:
a first area permitting dialing of a telephone number, the first area being one of the following:
a software generated dialing pad,
buttons for a software generated speed dialing list,
a call history list, or
an address book listing permitting single button dialing;
a second area having software generated button status indicators, wherein the status indicators are replaced by dialed numbers if a user dials a number on the dialing pad.

23. A modular cellular telephone, comprising:
an organizer including a standard address book;
a cellular component including software, the software uploaded to the organizer, when the cellular component is removably mated to the organizer;
a telephone address book replacing the standard address book in the organizer when the cellular component is mated to the organizer, the telephone address book comprising:
a database for receiving a plurality of names, the database including the data from the standard address book, the database displaying a name and a telephone number;
wherein when a name is selected from the database, the name is dialed automatically by the modular cellular telephone.

24. A modular cellular telephone comprising:
an organizer including a display screen;
a cellular component including software, the software uploaded to the organizer, when the cellular component is removably mated to the organizer;
a connected screen shown on the display screen of the organizer when the modular cellular telephone has a call, the connected screen including:
a first line status, if the modular cellular telephone has a connection, the first line status including a telephone number of the connection, and whether the first line is talking or on hold.

25. The modular cellular telephone of claim 24, wherein the connected screen further includes a second line status, if the modular cellular telephone has two connections, the second line status indicating a telephone number of the connection.

26. The modular cellular telephone of claim 24, wherein the connected screen further includes a call timer indicating the length of the connection.

27. A modular cellular telephone comprising:
an organizer including a display screen;
a cellular component including software, the software uploaded to the organizer, when the cellular component is removably mated to the organizer;
a voicemail screen shown on the display screen of the organizer, the voicemail screen including:
plurality of programmable control software generated buttons, the programmable control software generated buttons programmable to control a voicemail system.

28. The modular cellular telephone of claim 27, wherein the voicemail screen is organized like a Video Cassette Recorder (VCR), including buttons for each function of the voicemail.

29. The modular cellular telephone of claim 27, wherein multiple voicemail accounts are programmable, and the same voicemail screen is used for each voicemail account.

* * * * *